United States Patent
Olson

(10) Patent No.: US 9,352,521 B2
(45) Date of Patent: May 31, 2016

(54) BOSS SEAL FOR COMPOSITE OVERWRAPPED PRESSURE VESSEL

(71) Applicant: Michael A. Olson, Brigham City, UT (US)

(72) Inventor: Michael A. Olson, Brigham City, UT (US)

(*) Notice: Subject to any disclaimer, the term of this patent is extended or adjusted under 35 U.S.C. 154(b) by 239 days.

(21) Appl. No.: 14/286,896

(22) Filed: May 23, 2014

(65) Prior Publication Data

US 2014/0318691 A1    Oct. 30, 2014

Related U.S. Application Data

(63) Continuation of application No. 13/686,913, filed on Nov. 27, 2012, now Pat. No. 8,733,581.

(60) Provisional application No. 61/672,217, filed on Jul. 16, 2012, provisional application No. 61/674,263, filed on Jul. 20, 2012.

(51) Int. Cl.
*B29C 49/20* (2006.01)
*B29D 22/00* (2006.01)
*F17C 1/06* (2006.01)

(52) U.S. Cl.
CPC . *B29D 22/00* (2013.01); *F17C 1/06* (2013.01); *F17C 2201/0109* (2013.01); *F17C 2201/056* (2013.01); *F17C 2201/058* (2013.01); *F17C 2203/0604* (2013.01); *F17C 2203/0619* (2013.01); *F17C 2203/0663* (2013.01); *F17C 2203/0673* (2013.01); *F17C 2205/0305* (2013.01); *F17C 2209/2163* (2013.01); *F17C 2260/011* (2013.01); *F17C 2260/036* (2013.01); *F17C 2270/0745* (2013.01)

(58) Field of Classification Search
CPC ....................................................... B29C 49/20
USPC .......... 264/279, 516; 156/242, 245, 169, 172, 156/175
See application file for complete search history.

(56) References Cited

U.S. PATENT DOCUMENTS

| | | | |
|---|---|---|---|
| 4,587,074 A * | 5/1986 | De Loof | B29C 33/12 264/501 |
| 5,429,845 A | 7/1995 | Newhouse et al. | |
| 5,476,189 A | 12/1995 | Duvall et al. | |
| 5,518,141 A | 5/1996 | Newhouse et al. | |
| 6,227,402 B1 | 5/2001 | Shimojima et al. | |
| 6,230,922 B1 * | 5/2001 | Rasche | F17C 1/16 220/586 |
| 7,549,555 B2 | 6/2009 | Suzuki et al. | |
| 7,648,042 B2 | 1/2010 | Lee et al. | |
| 7,861,887 B2 | 1/2011 | Ota et al. | |
| 7,896,190 B2 | 3/2011 | Berger et al. | |
| 2005/0056966 A1 | 3/2005 | Bartlett et al. | |
| 2011/0253721 A1 | 10/2011 | Harmel | |
| 2011/0303681 A1 | 12/2011 | Newhouse et al. | |

* cited by examiner

*Primary Examiner* — Jeff Aftergut
(74) *Attorney, Agent, or Firm* — Warren M. Pate; Pate Peterson, PLLC

(57) ABSTRACT

A pressure vessel is disclosed. The pressure vessel may include a boss, a liner, an O-ring, and a composite overwrap of shell. A boss may comprise a through aperture, a first groove encircling the through aperture, and a first engagement mechanism. A liner may comprise an interior surface, exterior surface, and a second engagement mechanism. The interior surface may define an interior cavity of the pressure vessel. The second engagement mechanism may mechanically engage the first engagement mechanism to secure the liner to the boss. An O-ring may be positioned within the first groove of the boss and abut the exterior surface of the liner. A composite overwrap may surround the liner and at least a portion of the boss.

20 Claims, 7 Drawing Sheets

BOSS SEAL FOR COMPOSITE OVERWRAPPED PRESSURE VESSEL

RELATED APPLICATIONS

This application is a continuation of U.S. patent application Ser. No. 13/686,913 filed Nov. 27, 2012, which claims the benefit of U.S. Provisional Patent Application Ser. No. 61/672,217 filed Jul. 16, 2012 and U.S. Provisional Patent Application Ser. No. 61/674,263 filed Jul. 20, 2012.

U.S. patent application Ser. No. 13/686,913, U.S. Provisional Patent Application Ser. No. 61/672,217, U.S. Provisional Patent Application Ser. No. 61/674,263, as well as U.S. Pat. No. 5,429,845 issued Jul. 4, 1995 are each hereby incorporated by reference.

BACKGROUND

The Field of the Invention

This invention relates to pressure vessels and, more particularly, to novel systems and methods for composite overwrapped pressure vessels.

3. The Background Art

The development of advanced composite materials has enabled the development of lightweight pressure vessels with composite overwrap material. There are several different classifications of these pressure vessels including Type 4, which is a non-metallic liner with composite overwrap.

One of the design challenges associated with a Type 4 pressure vessel is the interface between the non-metallic liner and the metallic boss. The interface must provide a leak proof design that can withstand cyclic pressurization and depressurization over the life of the pressure vessel. Accordingly, what is needed is a boss that supports a leak proof engagement with a non-metallic liner.

BRIEF SUMMARY OF THE INVENTION

In view of the foregoing, in accordance with the invention as embodied and broadly described herein, a method and apparatus are disclosed in one embodiment of the present invention as including a vessel (e.g., a pressure vessel) comprising one or more of a liner (e.g., non-metallic liner), one or more bosses (e.g., metallic bosses), and an overwrap or shell. A liner may be substantially impermeable to the fluid to be contained within the vessel. A boss may provide a port enabling a conduit to engage a vessel and tap or replenish the fluid contained therewithin. An interface between a liner and a boss may ensure that the vessel will not leak and will remain intact over its intended design life. A shell may comprise various layers of filament wound over a liner and certain portions of a boss. When included, a shell may resolve certain stresses imposed on a vessel as it is pressurized.

In selected embodiments, a boss may include an engagement flange and one or more engagement mechanisms for securing a liner. For example, one side of an engagement flange may include one or more engagement grooves. In certain embodiments, a boss may include an inner engagement groove and an outer engagement groove. An O-ring groove may be positioned between the inner and outer engagement grooves. Accordingly, one or more engagement grooves may provide a structural and a sealing connection between a liner and a boss. Alternatively, one or more engagement grooves may provide a structural connection, while an O-ring groove (and an O-ring contained therewithin) may provide a seal between a liner and a boss.

An insert molding process may be used to connect a boss and a liner. In such a process, molten plastic material may fill one or more engagement grooves. As the plastic cools, it may hardened and lock itself therewithin, holding the plastic tight against an O-ring positioned within an O-ring groove. In selected embodiments, one or more engagement grooves may be shaped to retain the material molded therewithin. For example, one or more locking grooves may be undercut (e.g., having a dovetail shape) and increase in width as they extend deeper into a boss. In this manner, molten material may flow into the engagement grooves. However, once the molten material hardens, it may be locked in place.

Embodiments in accordance with the present invention may be especially well suited for composite overwrapped pressure vessels, but may also be used for other non-reinforced non-metallic pressure vessels. For example, in addition to overwrapped pressure vessels handling relatively high pressures of 4,500 psi to 20,000 psi or higher, there are also "low" pressure applications (e.g., applications in the range of 50 to 100 psi or the like) where an overwrap may not be required. Accordingly, in such embodiments, a vessel may simply comprise a liner engaging a boss in accordance with the present invention.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
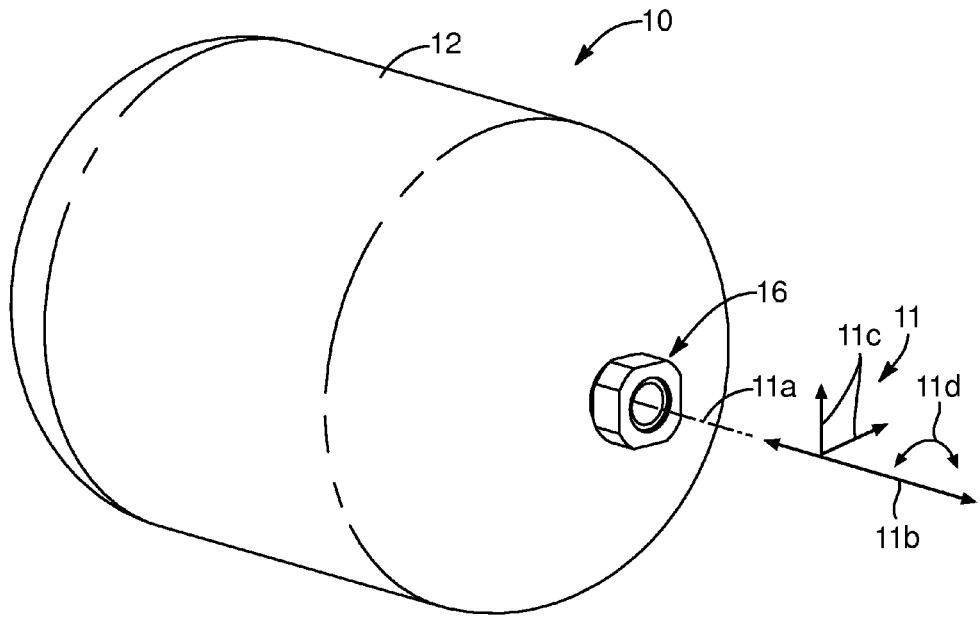
FIG. 1 is a perspective view of one embodiment of a pressure vessel in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 2:
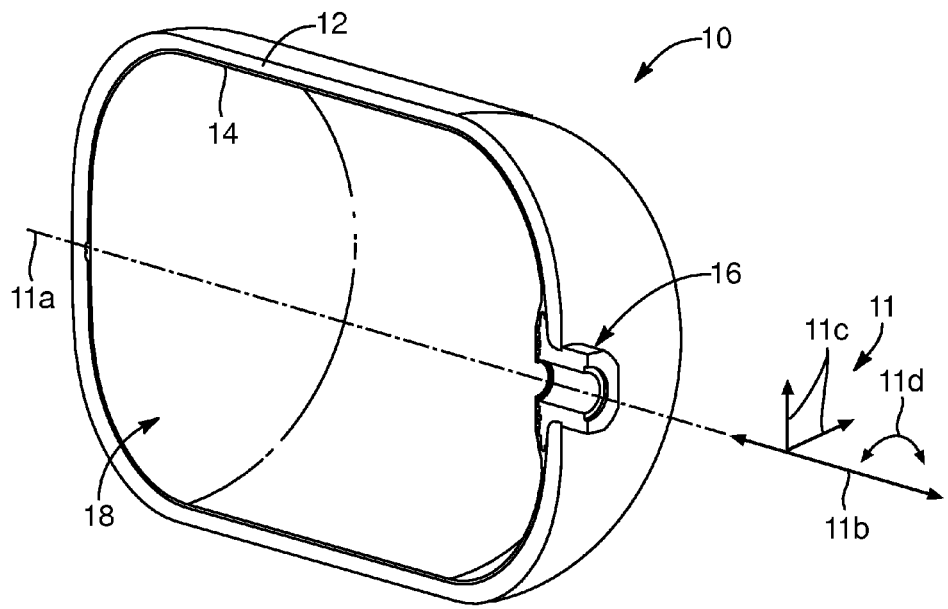
FIG. 2 is a perspective, cross-sectional view of the pressure vessel of FIG. 1.

Referring to FIGS. 1 and 2, in describing a vessel 10 in accordance with the present invention, it may be helpful to first establish a coordinate system 11. Accordingly, selected vessels 10 (or components thereof) may be described in terms of a central axis 11a, an axial direction 11b extending parallel to the central axis 11a, a radial direction 11c extending perpendicularly away from the central axis 11a, and a circumferential direction 11d extending circumferentially about the central axis 11a.

In selected embodiments, a vessel 10 in accordance with the present invention may be useful for containing a pressurized fluid. Accordingly, certain vessels 10 may be characterized as pressure vessels. A vessel 10 may have any suitable shape. Suitable vessels 10 may be or include one or more portions that are spherical, hemispherical, cylindrical, isotensoidal, geodesical, or the like or a combination or sub-combination thereof. For example, a vessel 10 may have a spherical shape or a cylindrical shape with generally hemispherical ends. In selected embodiments, a vessel 10 may be configured to exhibit or provide certain desirable characteristics such as lightweight construction, high resistance to fragmentation, high resistance to corrosion, and the like. In certain embodiments, a vessel 10 may be a high pressure composite container comprising a shell 12, liner 14, and one or more bosses 16.

In selected embodiments, a shell 12 may comprise laminated layers of wound filaments (e.g., carbon filaments, fiberglass, synthetic filaments, or the like) bonded together by a resin (e.g., a thermal-setting epoxy resin). In use, a shell 12 may be primarily responsible for resolving the structural loads associated with high pressure containment. The thickness (e.g., number of layers), filament type, wrapping pattern, etc. of a shell 12 may be selected to provide a desired strength. This strength may include certain safety factor over the operating pressures to be experienced by a particular vessel 10.

A liner 14 may be positioned internally with respect to a shell 12. In selected embodiments, a liner 14 (or combined liner 14 and boss 16) may form a mandrel about which the filaments of a shell 12 may be wound or wrapped during a manufacturing process. A liner 14 may be substantially impermeable to the fluid to be contained within the vessel 10. Accordingly, a liner 14 may be primarily responsible for sealing a vessel 10 and preventing internal fluids from contacting the composite materials of the shell 12.

In selected applications or embodiments, a liner 14 may have insufficient strength to contain a fluid pressurized past a certain, relatively low level. Accordingly, a liner 14 may transfer (e.g., off load) all or a large portion of the loads imposed thereon by a contained fluid to a shell 10, where such loads may be resolved. A liner 14 may be formed of any suitable material or combination of materials. In certain embodiments, a liner 14 may be formed of a polymeric material, elastomeric material, or the like. For example, a liner 14 may be formed of polyethylene (PE), high density polyethylene (HDPE), polypropylene (PP), acrylonitrile butadiene styrene (ABS), or the like.

A boss 16 may join a liner 14 to a corresponding shell 12. Additionally, a boss 16 may form a port (e.g., a threaded port) enabling a conduit to engage a vessel 10 and tap or replenish the fluid contained therewithin (e.g., tap or replenish fluid contained with a liner 14). An interface between a liner 14 and a boss 16 may prevent fluid from penetrating between the liner 14 and the shell 12. Such an interface may be sufficiently robust to properly perform its desired connection and sealing functions at relatively high operating pressures of 4,500 psi to 20,000 psi or higher.

In selected embodiments, a boss 16 may be a polar boss. That is, a boss 16 in accordance with the present invention may be positioned proximate a pole of a vessel 10. For example, in selected embodiments, a vessel 10 may have a cylindrical shape with generally hemispherical ends spaced in the axial direction 11b. Accordingly, a boss 16 may comprise a polar boss positioned at one of the hemispherical ends (e.g., centered with respect to a central axis 11b at or within a hemispherical end).

A vessel 10 may include more than one boss 16. In selected embodiments, a vessel 10 may include two bosses 16. For example, a first boss 16 may be a first polar boss positioned at one end or pole of a vessel 10. A second boss 16 may be a second polar boss positioned at an opposite end or pole of the vessel 10. The first and second bosses 16 may each be centered with respect to a central axis 11a.

A boss 16 may be formed of any suitable material. Depending on the pressures involved, suitable materials may include metals, metal alloys, polymers, ceramics, or the like. For example, in selected embodiments, a boss 16 may be machined from a single piece of aluminum or aluminum alloy. The particular alloy used may be selected to provide or balance the desired cost, machinability, strength, hardness, or the like. In certain embodiments, 7000 series aluminum alloys (e.g., 7175) may be suitable.

While certain situations or applications may be well suited to composite overwrapped pressure vessels, other situations or applications may be better served by other embodiments in accordance with the present invention. For example, there are "low pressure" applications (e.g., fire extinguisher applications, water softener applications, etc. in the range of 50 to 100 psi or the like) where an overwrap or shell 12 may not be required. Accordingly, in such embodiments, a vessel 10 may simply comprise a liner 12 engaging a boss 14 in accordance with the present invention.

Figure 3:
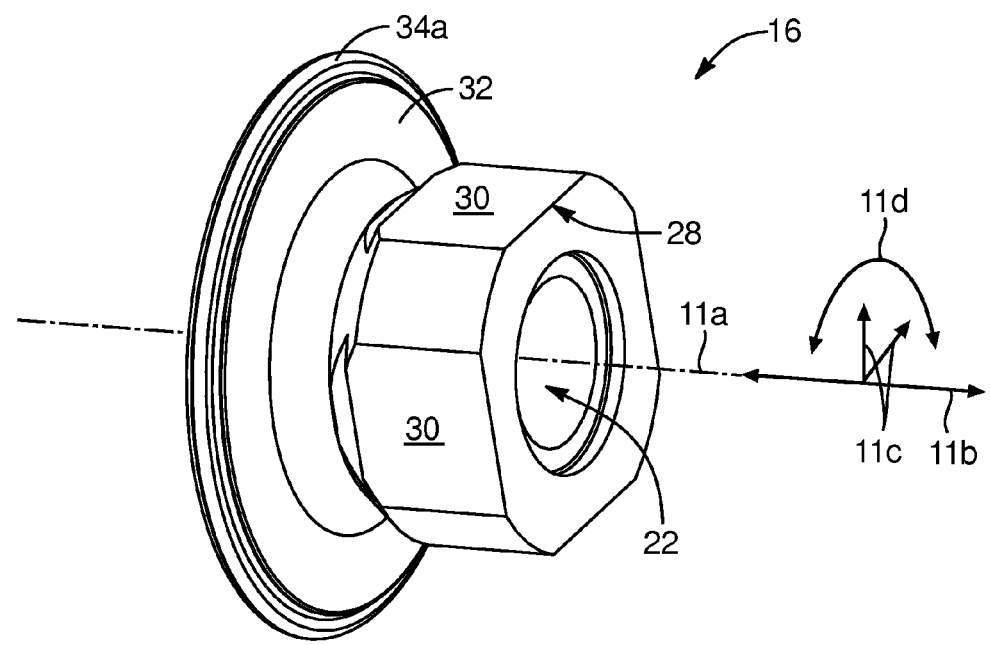
FIG. 3 is a first, perspective view of one embodiment of a boss in accordance with the present invention.
Figure 4:
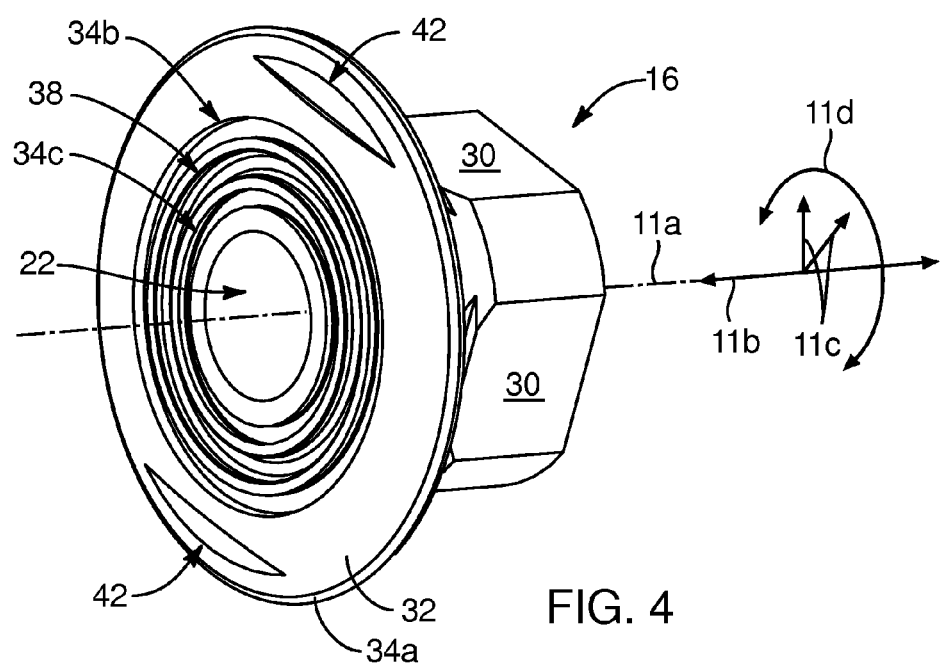
FIG. 4 is a second, perspective view of the boss of FIG. 3.
Figure 5:
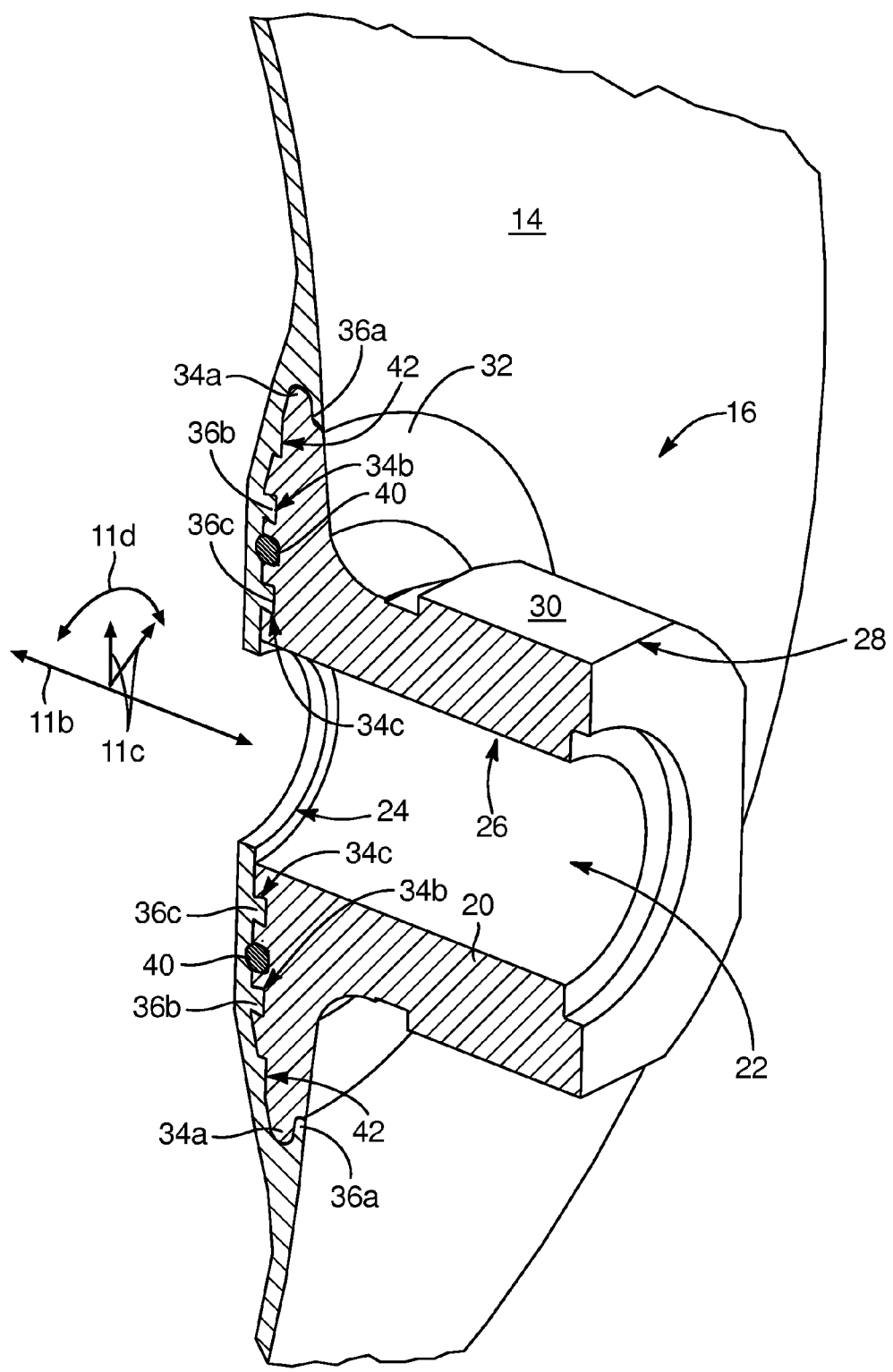
FIG. 5 is a partial, perspective, cross-sectional view of the boss of FIG. 3 connected to a liner in accordance with the present invention.

Referring to FIGS. 3-5, a boss 16 in accordance with the present invention may include a tubular neck 20 defining a through aperture 22. In selected embodiments, a tubular neck 20 and associated through aperture 22 may be centered on a central axis 11a and extend in an axial direction 11b defined thereby. When a vessel 10 is assembled or formed, a through aperture 22 of a boss 16 may correspond to or be aligned with an aperture 24 in a liner 14. Accordingly, fluid may pass through a through aperture 22 when entering or exiting a vessel 10.

A surface 26 defining a through aperture 22 may have any suitable configuration. In selected embodiments, such a surface 26 may be generally cylindrical in shape. The surface may be substantially smooth. Alternatively, the surface 26 may be configured to support engagement with one or more conduits, valves, or the like. For example, in selected embodiments, the surface 24 (or some portion thereof) may be threaded.

A surface 28 defining an exterior of a tubular neck 20 may have any suitable configuration. In selected embodiments, such a surface 28 may be configured to support engagement with one or more conduits, valves, or the like. For example, in selected embodiments, the surface 28 (or some portion thereof) may include one or more flats 30 supporting engagement with wrench, clamp, or the like. Alternatively, the surface 28 may include threads.

In certain embodiments, a boss 16 may include an engagement flange 32. An engagement flange 32 may extend radially from and circumferentially about one end (e.g., an internal or proximal end) of a tubular neck 20. A boss 16 may also include one or more engagement mechanisms 34. Each such engagement mechanism 34 may engage or secure a corresponding engagement mechanism 36 of a liner 14. For example, complementary engagement mechanisms 34, 36 may provide a secure structural interface between a liner 14 (e.g., non-metallic liner) and a dissimilar boss 16 (e.g., metallic boss) that will remain intact over the life of a vessel 10.

In selected embodiments, one or more engagement mechanisms 34 of a boss 16 may be positioned on an engagement flange 32. For example, an outer edge 34a or circumference 34a of an engagement flange 32 may extend into (e.g., be overlapped in the axial direction 11b by) a portion 36a of a liner 14. Accordingly, the outer edge 34a may form an engagement mechanism 34 of a boss 16 and the overlapping portion 36a may form an engagement mechanism 36 of a liner 14.

Alternatively, or in addition thereto, an engagement flange 32 may include one or more engagement grooves 34b, 34c or groove segments forming one or more engagement mechanisms 34. Such grooves 34b, 34c may be shaped to retainer the liner material applied thereto. For example, in selected embodiments, one or more engagement grooves 34b, 34c may be undercut (e.g., have a dovetail cross-section or an increase in width with an increase in depth). Accordingly, in a formation or assembly process, molten liner material may freely flow into an engagement groove 34b, 34c. However, once that material hardens, it may resist removal (e.g., removal in the axial direction 11b) from the engagement groove 34b, 34c. Thus, the hardened material 36b, 36c may form an engagement mechanism 36 of a liner 14.

In selected embodiments, one or more engagement grooves 34b, 34c may be formed on one or more sides of an engagement flange 32. For example, one side (e.g., an interior or proximal side) of an engagement flange 32 may include one or more engagement grooves 34b, 34c extending continuously in the circumferential direction 11d around a through aperture 22. In certain embodiments, two such grooves (e.g., an outer engagement groove 34b and an inner engagement groove 34c) may extend continuously in the circumferential direction 11d around a through aperture 22.

In selected embodiments, one or more seal or O-ring grooves 38 may be formed on one or more sides of an engagement flange 32. For example, one side (e.g., an interior or proximal side) of an engagement flange 32 may include one or more O-ring grooves 38 extending continuously in the circumferential direction 11d around a through aperture 22. In certain embodiments, one or more O-ring grooves 38 may be positioned proximate one or more engagement grooves 34b, 34c. For example, a boss 16 may comprise a single O-ring groove 38 positioned between inner and outer engagement grooves 34b, 34c. Accordingly, one or more engagement grooves 34b, 34c may provide a structural connection with a liner 14, while an O-ring groove 38 (in conjunction with an O-ring 40 contained therewithin) may assist in providing a seal between a liner 14 and a boss 16.

A boss 16 may include one or more features 42 (e.g., one or more extensions 42, indentations 42, or the like) resisting rotation of the boss 16 with respect to a corresponding liner 14. For example, in selected embodiments, an engagement flange 32 may include one or more extensions 42. Accordingly, as a liner 14 is applied (e.g., molded onto) a boss 16, the material of the liner 14 may surround, fill, etc. the features 42 and, once hardened, resist relative rotation (e.g., rotation about a central axis 11a) between a liner 14 and boss 16.

Figure 6:
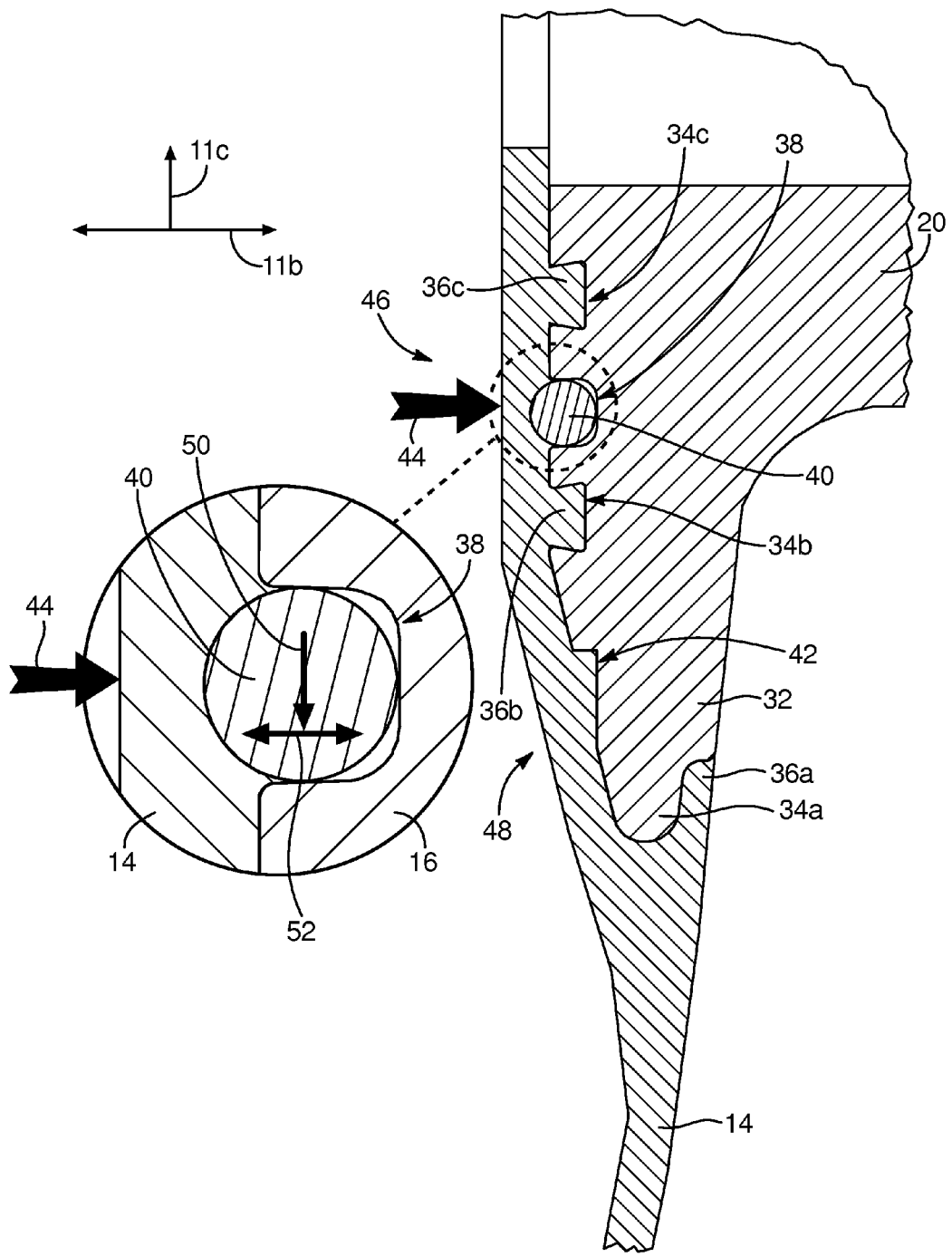
FIG. 6 is a partial, side, cross-sectional view of the boss of FIG. 3 connected to a liner in accordance with the present invention.

Referring to FIG. 6, in selected embodiments, during a formation process, molten material forming a liner 14 may surround or abut one side of an O-ring 40 (e.g., a side facing away from an O-ring groove 38). For example, molten material may enter a portion of an O-ring groove 38. The amount of material entering may depend on the formation process. For example, less material may enter when a liner 14 is formed in a roto-molding process than when a liner 14 is formed in an injection molding process. In selected embodiments, the material entering a portion of an O-ring groove 38 or abutting an O-ring 40 may assist in sealing a liner 14 with respect to a boss 14.

In certain embodiments, pressure 44 within a vessel 10 may assist in maintaining a seal between a liner 14 and a boss 16. In selected embodiments, internal pressure 44 may urge, seat, or maintain a portion of a liner 14 firmly seated against an O-ring 40. For example, on an interior side 46 of an O-ring 40, a seam between a liner 14 and a boss 16 may be pressurized to substantially the same pressure as the interior of the liner 14. The interior pressure 44 may oppose or balance this seam pressure and resist the separation that such seam pressure may otherwise induce.

Additionally, on an exterior side 48 of an O-ring 40, a seam between a liner 14 and a boss 16 may be at ambient pressure. With the interior pressure 44 being larger (e.g., much larger) than ambient pressure, the interior pressure 44 may bias the liner 14 or a portion thereof firmly against the boss 14 along the seam on the exterior side 48. This bias may extend to the seal created by the O-ring 40. Thus, the bias may urge the liner 14 firmly against the O-ring 40.

In certain embodiments, pressure on an interior side 46 may compress 50 an O-ring 40, urging it toward the exterior side 48. This compression 50 in one direction may, in turn, urge an expansion 52 of an O-ring 40 in another direction (e.g., in an orthogonal direction). This urged expansion 52 may assist in seating an O-ring 40 with sufficient force to produce the desired seal. Alternatively, or in addition thereto, the urged expansion 52 acting against the internal pressure 44 may assist in seating an O-ring 40 with sufficient force to produce the desired seal. Accordingly, certain vessels 10 in accordance with the present invention may have burst pressures up to about 30,000 psi or higher.

An O-ring 40 in accordance with the present invention may be formed of any suitable material. A suitable material may be selected to provide a desired strength, spring constant, resilience, hardness, durability, chemical resistance, operable temperature range, or the like. In selected embodiments, an O-ring 40 formed of polytetrafluoroethylene (PTFE), Buna-N, some other rubber compound, silicone, or the like may be suitable.

Figure 7:
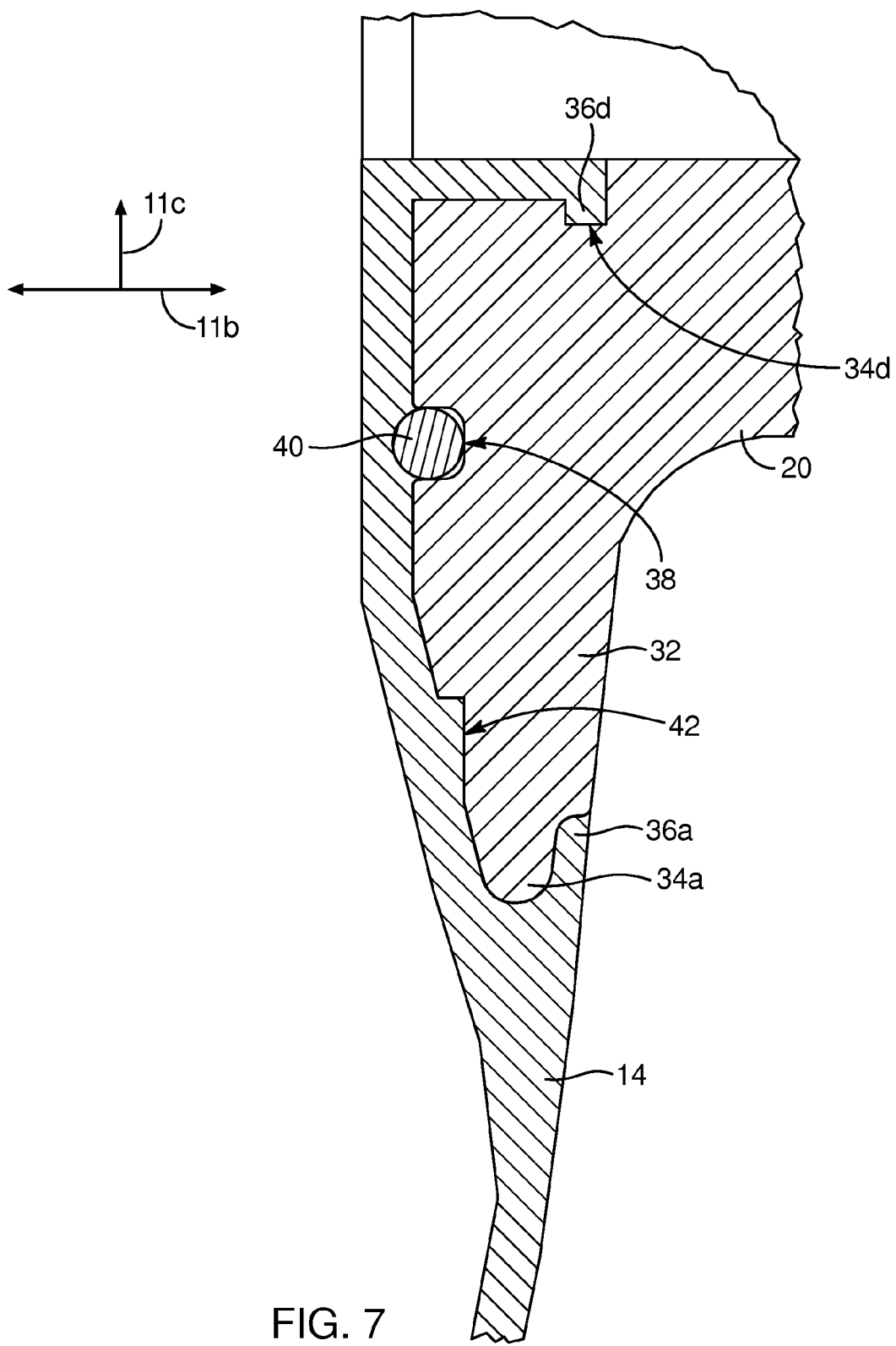
FIG. 7 is a partial, perspective, cross-sectional view of an alternative embodiment of a boss connected to a liner in accordance with the present invention.

Referring to FIG. 7, engagement mechanisms 34 in accordance with the present invention may have any suitable shape, positioning, or configuration. As set forth hereinabove, a boss 16 may include one or more engagement mechanisms 34 configured as engagement grooves 34b, 34c located on a side of an engagement flange 32. Alternatively, or in addition thereto, a boss 16 may include an engagement groove 34d, recess 34d, or axial undercut 34d formed within a through aperture 22.

Figure 8:
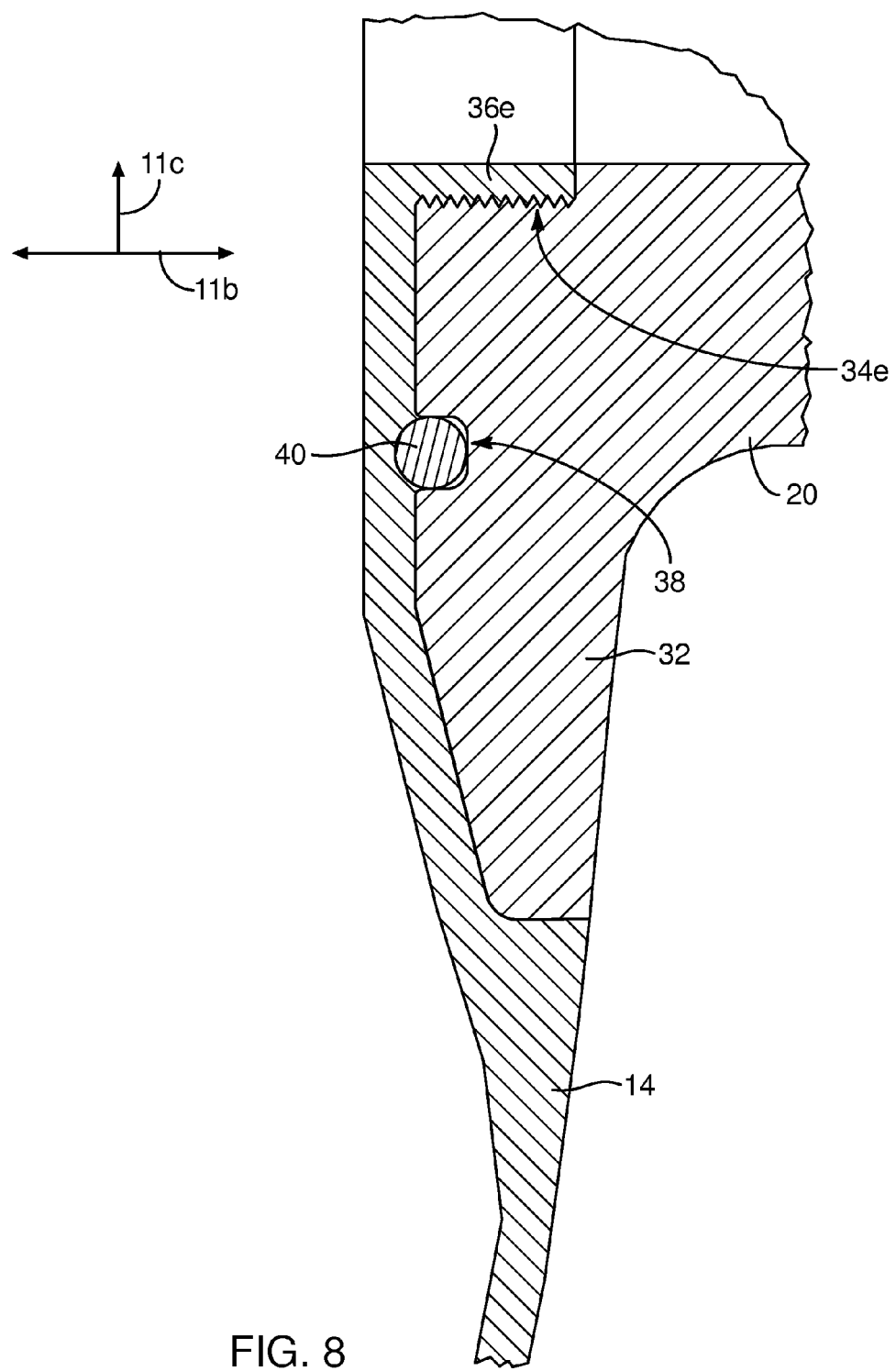
FIG. 8 is a partial, perspective, cross-sectional view of another alternative embodiment of a boss connected to a liner in accordance with the present invention.

Referring to FIG. 8, in selected embodiments, a liner 14 may be configured to support selective attachment and detachment from a boss 16. Accordingly, a liner 14 may first be formed and then later attached to a boss 17. This may be beneficial when certain processes associated with forming a liner 14 may be incompatible with or adverse to a boss 16. For example, in selected embodiments, a boss 16 may be heat treated to provide certain desirable properties. Connecting such a boss 16 with a liner 14 in an insert molding process (e.g., a rotomolding process) may expose the boss 16 to heat that may disrupt or "erase" the heat treatment and the desirable properties associated therewith.

A liner 14 may be selectively attached to or detached from a boss 16 in any suitable manner. For example, in selected embodiments, a portion 34e of a through aperture 22 may be threaded. A corresponding portion 36e of a liner 14 may be similarly threaded. Accordingly, in an assembly process, a liner 14 may be threaded into or onto a boss 16. In such embodiments, an overlapping portion 36a of a liner 14 (e.g., as seen in FIG. 7) may be omitted, leaving no obstruction to threading the liner 14 into or onto a boss 16.

Figure 9:
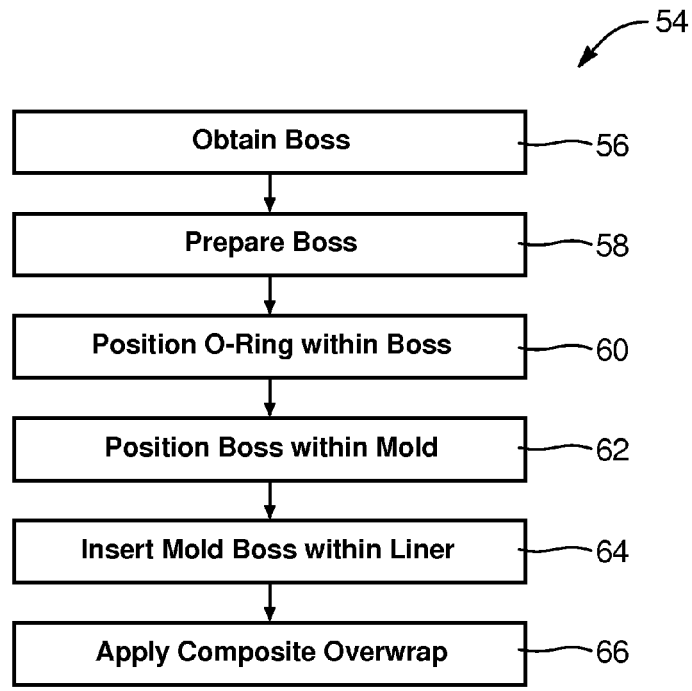
FIG. 9 is a schematic block diagram of an embodiment of a method in accordance with the present invention.

Referring to FIG. 9, vessel 10 in accordance with the present invention may be formed by any suitable method. In selected embodiments, the formation of a vessel 10 may include an insert molding process. For example, a method 54 of forming a vessel 10 may begin with obtaining 56 a boss 16 in accordance with the present invention. The boss 16 may then be prepared 58. Such preparation may include texturing, cleaning, or the like. For example, in selected embodiments, one or more surfaces of a boss 16 that will contact a liner 14 may be roughened or textured in a sand-blasting process. The boss 16 may then be cleaned to remove any debris, particles, oils, or the like to promote proper adhesion.

Once a boss 16 has been prepared 58, an O-ring 40 may be positioned 60 within the boss 16 (e.g., within an appropriate groove 38 of the boss 16). An O-ring 40 may be held within a corresponding groove 38 in any suitable manner. In selected embodiments, one or more of a groove size, O-ring size, O-ring material, or the like may be selected to ensure that an O-ring 40 is self-securing and will not inadvertently fall out of place. A boss 16 may then be placed 62 or positioned 62 within an appropriate mold. A liner 14 may be formed and connected to a boss 16 in an insert molding step 64 or sub-process 64. This molding step 64 may be of any suitable type, including roto-molding, injection molding, blow molding, etc.

With the completion of a molding step 64, a combined liner 14 and boss 16 may be removed from a mold and used in certain "low pressure" applications. Alternatively, a composite overwrap may be applied 66 to the combined liner 14 and boss 16, which may produce a vessel 10 capable of containing significant pressures.

Figure 10:
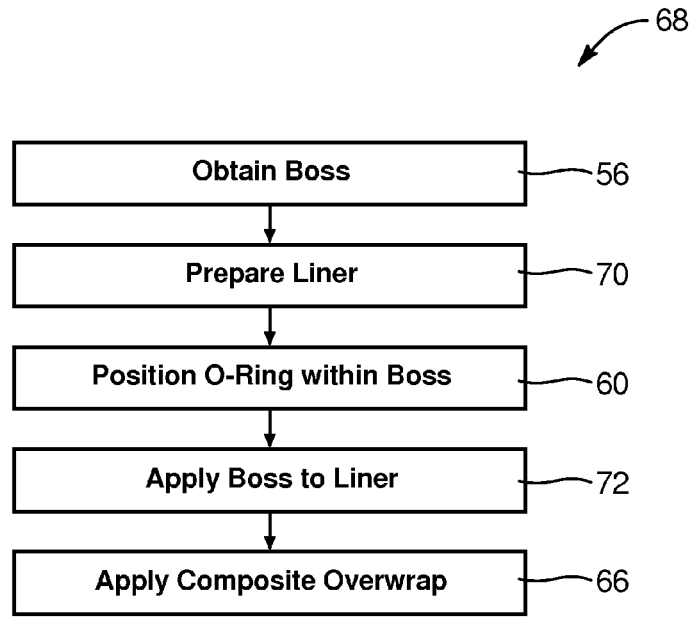
FIG. 10 is a schematic block diagram of another embodiment of a method in accordance with the present invention.

Referring to FIG. 10, in selected embodiments, the formation of a vessel 10 may not include an insert molding process. For example, an alternative method 68 of forming a vessel 10 may begin with obtaining 56 a boss 16 and obtaining 70 a liner 14. A liner 14 may be obtained (e.g., formed) in any suitable process. For example, in certain embodiments, a liner 14 may be formed in a roto-molding, injection molding, or blow molding process.

An O-ring 40 may be positioned 60 within the boss 16 (e.g., within an appropriate groove 38 of the boss 16). The boss 16 may then be applied 72 to the liner 14. For example, the liner 14 may be threaded or snapped onto or into the boss 16. A combined liner 14 and boss 16 may be used in certain low pressure applications. Alternatively, a composite overwrap 12 may be applied 66 to the combined liner 14 and boss 16.

It should be noted that, in some alternative implementations, the functions noted in the blocks may occur out of the order noted in FIGS. 9 and 10. In certain embodiments, two blocks shown in succession may, in fact, be executed substantially concurrently, or the blocks may sometimes be executed in the reverse order, depending upon the functionality involved. For example, in FIG. 9, the positioning 60 of an O-ring 40 may occur after a boss 16 has been positioned 62 within a mold. Alternatively, certain steps or functions may be omitted if not needed. For example, in certain embodiments, the step of applying 66 an overwrap 12 may be omitted.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method of manufacturing a pressure vessel, the method comprising:
    positioning a boss as an insert within a mold, the boss comprising a through aperture, a first groove encircling the through aperture, an engagement mechanism, and an O-ring positioned within the first groove;
    molding, within the mold after the positioning, a polymeric container such that a portion of the polymeric container is molded directly against the O-ring;
    the molding comprising engaging, by polymeric material of the polymeric container, the engagement mechanism to secure the polymeric container to the boss; and
    removing, after the molding, the boss and polymeric container as a unit from the mold.

2. The method of claim 1, further comprising wrapping, after the removing, the polymeric container and at least a portion of the boss with a composite material.

3. The method of claim 1, wherein:
    the O-ring has a convex surface; and
    the molding further comprises forming the polymeric material to abut and substantially match the convex surface of the O-ring.

4. The method of claim 1, wherein:
    the engagement mechanism comprises a first undercut cavity formed in the boss; and
    the molding further comprises filling the first undercut cavity with the polymeric material.

5. The method of claim 4, wherein:
    the engagement mechanism further comprises a second undercut cavity formed in the boss; and
    the molding further comprises filling the second undercut cavity with the polymeric material.

6. The method of claim 5, wherein the first undercut cavity comprises a second groove encircling the through aperture.

7. The method of claim 6, wherein the second undercut cavity comprises a third groove encircling the through aperture.

8. The method of claim 7, wherein the first, second, and third grooves are concentric.

9. The method of claim 8, wherein the second groove is interior to the first groove.

10. The method of claim 9, wherein the first groove is interior to the third groove.

11. A method of manufacturing a pressure vessel, the method comprising:
    positioning a boss as an insert within a mold, the boss comprising a through aperture, a first groove encircling the through aperture, an engagement mechanism, and an O-ring positioned within the first groove;
    molding, within the mold after the positioning, a liner to have an interior surface and an exterior surface, the interior surface defining an interior cavity of the pressure vessel;

the molding comprising molding the exterior surface directly against the O-ring;
the molding further comprising engaging, by material of the liner, the engagement mechanism to secure the liner to the boss; and
wrapping, after the molding, the liner and at least a portion of the boss with a composite material.

12. The method of claim 11, wherein:
the boss comprises a flange extending radially away from the through aperture, the flange having a first side facing a first direction and a second side facing a second direction substantially opposite to the first direction; and
the first groove is formed in the first side of the boss.

13. The method of claim 12, wherein
the engagement mechanism comprises a first undercut cavity formed in the first side of the boss; and
the molding further comprises filling the first undercut cavity with the polymeric material.

14. The method of claim 13, wherein:
the engagement mechanism further comprises a second undercut cavity formed in the first side of the boss; and
the molding further comprises filling the second undercut cavity with the polymeric material.

15. The method of claim 14, wherein the first undercut cavity comprises a second groove encircling the through aperture.

16. The method of claim 15, wherein the second undercut cavity comprises a third groove encircling the through aperture.

17. The method of claim 16, wherein the first, second, and third grooves are concentric.

18. The method of claim 17, wherein the second groove is interior to the first groove.

19. The method of claim 18, wherein the first groove is interior to the third groove.

20. A method of manufacturing, the method comprising:
positioning an insert within a mold, the insert comprising a metal component, a groove formed in the metal component, an engagement mechanism, and a seal component positioned within the first groove;
molding, within the mold after the positioning, a polymeric component such that a portion of the polymeric component is molded directly against the sealing component;
the molding comprising engaging, by polymeric material of the polymeric component, the engagement mechanism to secure the polymeric container to the boss;
removing, after the molding, the metal component and the polymeric component as a unit from the mold; and
sealing, by the sealing component, an interface between the metal component and the polymeric component.

* * * * *